United States Patent [19]
Cole

[11] 4,176,881
[45] Dec. 4, 1979

[54] LOCK DEVICE FOR DUMP TRUCKS

[76] Inventor: H. Ray Cole, R.R. 1, Rosendale, Mo. 64483

[21] Appl. No.: 900,414

[22] Filed: Apr. 27, 1978

[51] Int. Cl.$^2$ .............................................. B60P 1/16
[52] U.S. Cl. ..................................... 298/22 J; 298/38
[58] Field of Search ...................... 298/22 R, 22 J, 38, 298/22 P, 22 D

[56] References Cited

U.S. PATENT DOCUMENTS

| Re. 22,955 | 12/1977 | Penney | 298/38 |
| 131,095 | 9/1872 | Glover | 298/38 |
| 1,670,232 | 5/1928 | Biszantz | 298/38 X |
| 2,954,995 | 10/1960 | Grise | 298/23 |

Primary Examiner—Trygve M. Blix
Assistant Examiner—George F. Abraham
Attorney, Agent, or Firm—Lowe, Kokjer, Kircher, Wharton & Bowman

[57] ABSTRACT

A self acting lock which automatically locks down the dump body of a truck and automatically releases when the body is to be raised. Two pairs of lever arms which are pivoted together cooperate with a single acting hydraulic cylinder to provide a hoist for raising and lowering the dump body. The upper arms are pivoted to the body and the lower arms are pivoted to a pair of links which are in turn pivotally mounted to the truck frame. Each link carries a hook which engages with a keeper rod carried on the upper pair of arms to lock down the body. A leg extending from the upper arms pivots the links in a direction to engage the hooks with the keeper rod in response to lowering of the dump body to the load carrying position. The linkage is arranged such that initial extension of the cylinder pivots the links in a direction to release the hooks from the rod before continued extension of the cylinder raises the dump body in the usual manner.

9 Claims, 3 Drawing Figures

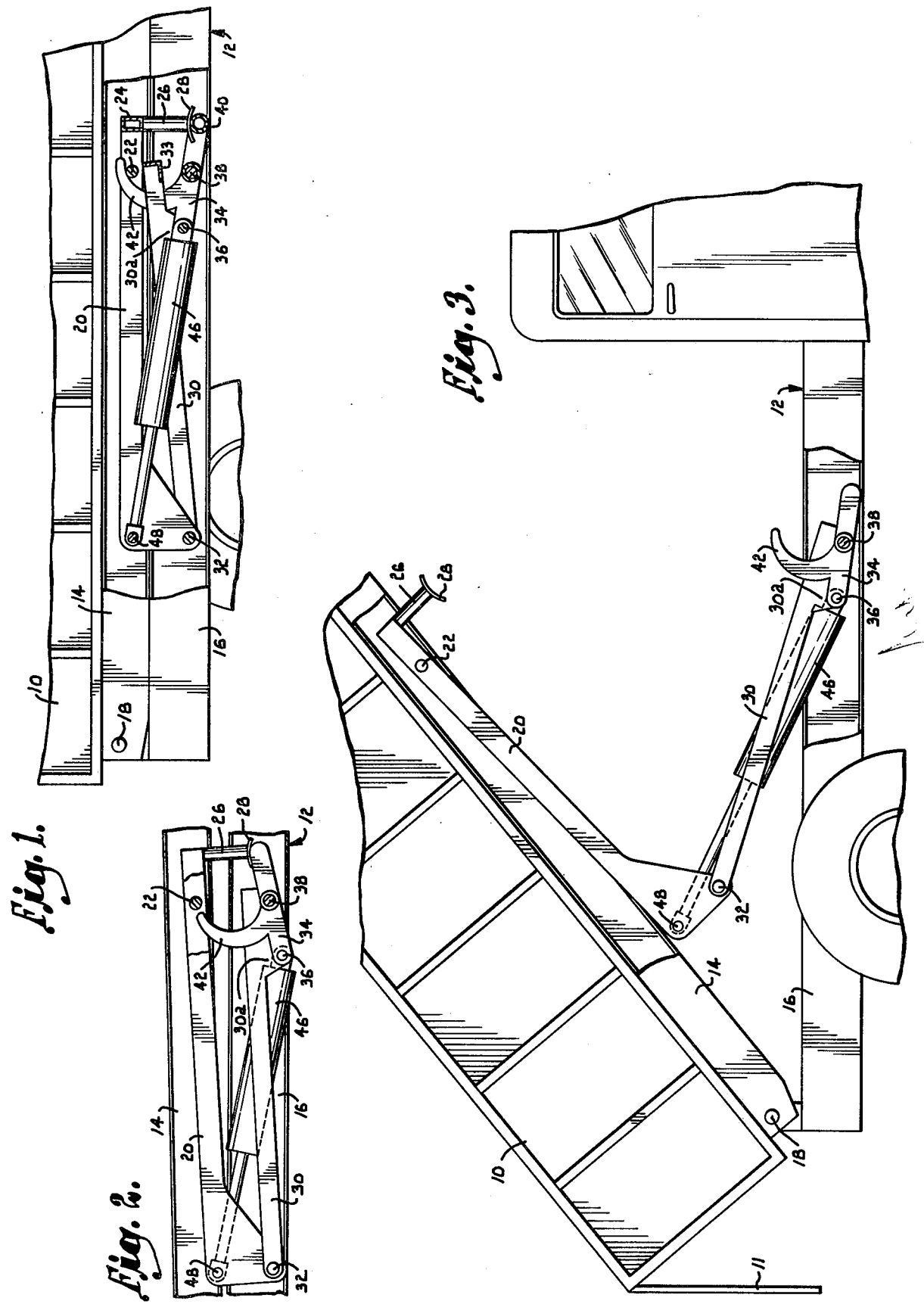

LOCK DEVICE FOR DUMP TRUCKS

BACKGROUND AND SUMMARY OF THE INVENTION

This invention relates in general to lock devices and deals more specifically with an automatically acting lock device for holding a dump-type truck body.

Dump trucks and similar vehicles having tiltable bodies are used in a wide variety of applications, including the carrying of livestock and other loads which tend to shift considerably during transport. To prevent accidental raising of the truck body and other adverse consequences caused by shifting of such loads, it is common for the body to be manually locked to the truck frame after the power cylinder has been retracted to lower the body to the load carrying position. Although lock devices of this type hold down the dump body satisfactorily, it is necessary to lock them manually and also to release them manually when the contents are to be unloaded. Not only does this procedure require time and inconvenience, it is not uncommon for the operator to neglect to activate the lock at times, thereby leaving the truck body free to accidently raise under the influence of shifting loads and other forces. Moreover, manual hold downs wear out or become misadjusted so that the truck body is loose and can bounce and jar on the frame, causing abrasion and undue wear on both the truck body and the frame.

While self acting automatic type locks have been proposed, they have not met with success for a variety of reasons. The main drawback of such locks is that they are so complicated and expensive as to make them impractical in most applications. Furthermore, this type of device is difficult to install, and it is not well suited for use with all of the various styles of truck bodies and the various hoists that are used. The self acting locks that have been proposed are also susceptible to accidental release, particularly after they have been subjected to the wear that accompanies prolonged use.

Another approach that has been taken is to utilize a double acting hydraulic cylinder which maintains the truck body down by means of hydraulic pressure. Even though this approach has met with a measure of acceptance, it has not been entirely satisfactory in all respects. Most notably, it is often not practical to incur the increased cost of the double acting cylinder as compared to the more economical single acting cylinder. In any event, the need for a double acting cylinder adds significantly to the overall cost and complexity of the dump mechanism. In addition, it is necessary to maintain continuous hydraulic pressure during transport, and failure of the hydraulic system or loss of pressure for any reason releases the truck body, possibly at an inopportune time. The same problems exist for all lock devices which rely on fluid pressure for their operation. When the joints are worn or improperly adjusted, the double acting cylinder is unable to hold down the truck body tightly enough to prevent bouncing and jarring and the accompanying damage to the bed and truck frame.

In view of these and other difficulties in existing lock device, it is the principal goal of the present invention to provide an improved automatically acting lock device for dump-type truck bodies.

More specifically, it is an object of the invention to provide a lock device which automatically locks when the truck body is lowered and which automatically releases when the power cylinder is activated to raise the body. Consequently, the possibility of human error is eliminated, as is the time and inconvenience associated with the manually operated locks currently in widespread use.

Another object of the invention is to provide a lock device of the character described that is readily adapted for use with truck bodies of virtually any size and construction.

Still another object of the invention is to provide a lock device of the character described that may be used with various types of hoists and dumping mechanisms.

An additional object of the invention is to provide a lock device of the character described which operates by means of a mechanical linkage that does not rely on fluid pressure to hold the dump body.

A further object of the invention is to provide a lock device of the character described which is constructed simply and economically and which operates reliably even after extensive use.

Other and further objects of the invention, together with the features of novelty appurtenant thereto, will appear in the course of the following description.

DETAILED DESCRIPTION OF THE INVENTION

In the accompanying drawing which forms a part of the specification and is to be read in conjunction therewith and in which like reference numerals are used to indicate like parts in the various views:

FIG. 1 is a fragmentary side elevational view of a dump-type truck body that is equipped with a lock device constructed according to a preferred embodiment of the present invention, with the body locked in the load carrying position and portions broken away for purposes of illustration;

FIG. 2 is a fragmentary side elevational view similar to FIG. 1, but with the lock device moved to the release position; and FIG. 3 is an elevational view similar to FIGS. 1 and 2, but showing the truck body fully raised to the dumping position.

Referring now to the drawing in more detail, numberal 10 generally designates a conventional truck mounted dump body having a box-like configuration and the usual tailgate 11. The body 10 is pivotally coupled in a conventional manner to a truck frame 12. Parallel channels 14 secured to the underside of body 10 are pivoted to the rear ends of the sides 16 of the truck frame by means of a horizontal cross shaft 18 located at the rear of the truck.

Body 10 is raised and lowered by a hoist mechanism which includes a pair of parallel arms 20 pivotally connected near their forward ends to channels 14 by a horizontal rod 22. A horizontal beam 24 (FIG. 1) extends between the forward ends of arms 20, and a leg 26 extends downwardly from a central location on the beam 24. Leg 26 carries a curved foot plate 28 on its lower end.

The hoist further includes a pair of parallel levers 30 which are pivoted at their rearward ends to the enlarged rearward ends of arms 20 by pivot couplings 32. An angle member 33 (FIG. 1) extends between the forward ends of levers 30. Slightly to the rear of their forward ends, levers 30 are provided with downwardly extending lugs 30a. The rearward ends of a pair of short parallel links 34 are pivoted to lugs 30a by means of a horizontal shaft 36. A cross-shaft 38 extends between the frame sides 16 and serves to pivotally mount links 34 to the frame at central locations on the links. Extending between the forward ends of links 34 is a horizontal rod 40 (FIG. 1) which cooperates with the foot plate 28 in a manner that will be made clear.

Each link 34 carries an integral hook 42 which extends upwardly from the link and which curves forwardly. Hooks 42 serve as latches which lock the truck body in its load carrying position by engaging a keeper in the form of the horizontal rod 22 which pivotally mounts arms 20 to body 10.

The truck body is raised and lowered by a conventional single acting hydraulic cylinder 46 having its base end pivotally mounted on shaft 36. The rod of cylinder 46 is pivotally connected with a shaft 48 that extends between the enlarged rearward ends of arms 20 at a location offset from pivot couplings 32. It is apparent that extension of the cylinder 46 raises body 10, while the release of fluid pressure from the cylinder causes lowering of the body to the normal load carrying position.

In use, hooks 42 are automatically engaged with rod 22 when the fluid pressure in cylinder 46 is released such that body 10 is lowered from the raised dumping position (FIG. 3) to the load carrying position (FIG. 1). When the truck body has been lowered to the position shown in FIG. 2, the foot plate 28 comes into contact with rod 40. Additional lowering of arms 20 results in plate 28 pushing downwardly on rod 40 to pivot links 34 in a clockwise direction about shaft 39 (as viewed in FIG. 2). Such pivotal movement of the links carries hooks 42 into locking position wherein they are engaged on rod 22. When the body has been fully lowered to the FIG. 1 position, hooks 42 are firmly locked on rod 22 to securely hold body 10 in the load carrying position.

The lock mechanism releases automatically when cylinder 46 is activated to begin raising the truck body. When the cylinder is initially extended from the FIG. 1 position, the immediate consequences is counterclockwise pivoting of links 34 about shaft 38, since hooks 42 are locked to rod 22 and arms 20 cannot be raised. Therefore, the force applied by cylinder 46 as it initially extends, exerts a counterclockwise movement on links 34 which pivots them sufficiently to release hooks 42 from rod 22 when the cylinder has been extended to the position shown in FIG. 2. At this point, the angle member 33 has moved into contact with the top of shaft 38 and further counterclockwise pivoting of links 34 is thereby precluded. Because hooks 42 are now disengaged from rod 22, additional extension of cylinder 46 causes raising of arms 20 and corresponding upward pivoting body 10 in the normal fashion. It is apparent that lost motion action occurs when cylinder 46 is initially extended since the cylinder does not begin to raise body 10 appreciably until after it has been extended sufficiently to release the lock by pivoting links 34 in a counterclockwise direction.

In this manner, the lock mechanism effects automatic engagement of the lock components when body 10 is fully lowered and automatically releases the lock prior to raising of the body from the load carrying position. It is pointed out that when the body 10 is raised above the load carrying position, shaft 36 is below a straight line extending between shaft 38 and the pivot couplings 32 which connect arms 20 with levers 30 (see FIG. 3). As a result, the force applied by cylinder 46 prevents links 34 from pivoting clockwise to an extent which could interfere with subsequent lowering of body 10. The arrangement of pivot point 36 below a line extending from shaft 38 and coupling 32 also stabilizes cylinder 30 while it is raising body 10. Conversely, when the body is fully lowered to the load carrying position shown in FIG. 1, the shaft 36 is above a straight line extending between shaft 38 and couplings 32. This stabilizes the locking linkage in the load carrying position, and precludes vibrations or shifting forces from accidentally unlatching hooks 42.

It is noted that the weight of the hoist tends to pivot it downwardly about rod 22. When the truck body is in the load carrying position of FIG. 1, this tendency applies toward pressure on arms 30 which is applied at shaft 36 and is translated into a clockwise bias on links 34. Consequently, hooks 42 are firmly maintained in engagement with rod 22 to securely hold down the body 10, even after the joints become worn.

Although the preferred embodiment includes two hooks 42, any desired number of hooks may be employed and the hooks may engage portions of the truck body other than rod 22.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawing is to be interpreted as illustrative and not in a limiting sense.

Having thus described my invention, I claim:

1. A lock device for a dump body mounted to pivot on a frame between a load carrying position and a dumping position, said device comprising:
   a hoist mechanism coupled between said body and frame and including extensible power cylinder means for pivoting the body between the load carrying position and the dumping position;
   a first lock component coupled with said body;
   a second lock component coupled with said frame and engageable with said first lock component to lock said body in the load carrying position; and
   a mechanical linkage comprising lost motion means coupling said cylinder means with said frame in a manner to effect automatic engagement of said first and second lock components when the body is in the load carrying position, said lost motion means being arranged such that initial extension of said cylinder means from the load carrying position effects driving movement of said linkage to release said lock components prior to movement of said body away from the load carrying position.

2. A device as set forth in claim 1, wherein:
   said hoist mechanism includes first and second arm members pivotally coupled with one another, said first arm member being coupled with said body;
   said linkage includes a link member coupled with said second arm member for movement about a first pivot axis and with said frame for movement about a second pivot axis offset from said first axis; and said second lock component is carried on said link member for movement therewith about said second pivot axis to engage and release from said first lock component.

3. A device as set forth in claim 2, wherein said power means comprises an extensible and retractable cylinder pivotally coupled at one end with said first arm member and at the opposite end with said link member at a location offset from said second pivot axis.

4. A device as set forth in claim 3, wherein said opposite end of the cylinder is pivotally coupled with said link member at the location of said first pivot axis.

5. A device as set forth in claim 2, including means mounted on said body at a position to engage said link member in a manner to pivot same in a direction to effect engagement of said second lock component with said first lock component automatically upon movement of said body to the load carrying position.

6. A device as set forth in claim 2, wherein said first pivot axis is at least as low as an imaginary straight line extending between said second pivot axis and the pivot connection between said first and second arm members, when said body is out of the load carrying position.

7. A device as set forth in claim 6, wherein said first pivot axis is at least as high as an imaginary straight line extending between said second pivot axis and the pivot connection between said first and second arm members when said body is in the load carrying position.

8. A device as set forth in claim 2, including means on said second arm member for limiting the movement said link member about said second pivot axis in a preselected pivotal direction.

9. A device as set forth in claim 8, including means on said first arm member for pivoting said link member in a direction to effect engagement of said second lock component with said first lock component in response to movement of said body to the load carrying position.

* * * * *